(12) United States Patent
Bueermann

(10) Patent No.: US 6,783,454 B2
(45) Date of Patent: Aug. 31, 2004

(54) COMBINE WITH ADJUSTABLE STRAW GUIDE

(75) Inventor: Martin Bueermann, Hornbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/396,686

(22) Filed: Mar. 25, 2003

(65) Prior Publication Data

US 2003/0190939 A1 Oct. 9, 2003

(30) Foreign Application Priority Data

Apr. 5, 2002 (DE) .......................................... 102 15 026

(51) Int. Cl.$^7$ .............................................. A01F 12/40
(52) U.S. Cl. ..................................... 460/112; 460/901
(58) Field of Search ......................... 460/111–112, 113, 460/901, 1, 6; 56/10.2 R, DIG. 15

(56) References Cited

U.S. PATENT DOCUMENTS

| 4,383,536 | A | * | 5/1983 | Delorme ........................ 460/1 |
| 4,489,734 | A | | 12/1984 | Van Overschelde .......... 130/27 |
| 4,677,991 | A | * | 7/1987 | Harris et al. .................... 460/8 |
| 4,875,889 | A | * | 10/1989 | Hagerer et al. ................. 460/1 |
| 4,921,469 | A | * | 5/1990 | Scharf .......................... 460/10 |
| 5,569,081 | A | * | 10/1996 | Baumgarten et al. ....... 460/112 |
| 6,073,427 | A | | 6/2000 | Nichols ....................... 56/10.2 |

FOREIGN PATENT DOCUMENTS

| DE | 43 13 841 A1 | 11/1994 |
| EP | 537612 A2 * | 4/1993 |
| EP | 0 685 151 B1 | 12/1995 |

* cited by examiner

Primary Examiner—Thomas B. Will
Assistant Examiner—Meredith Petravick

(57) ABSTRACT

A combine comprising a separator feeds straw to a discharge assembly. An adjustable straw guide is adjusted by a motor that is controlled by a controller. The controller receives signals from a sensor that senses the transverse distribution of the straw. The adjustable straw guide is positioned between the separator and the discharge assembly. The sensor is arranged to detect the straw upstream of the outlet of the discharge assembly.

16 Claims, 2 Drawing Sheets

COMBINE WITH ADJUSTABLE STRAW GUIDE

FIELD OF THE INVENTION

The present invention is directed to a combine having a separator from which straw is expelled to a discharge assembly, an adjustable straw guide is associated with the discharge assembly. A motor adjusts the straw guide in response to signals from a controller.

BACKGROUND OF THE INVENTION

When one uses add-on straw choppers attached to combines, the chopped straw should be delivered along a cutting width in as uniform a weight distribution as possible over that width. A conventional straw chopper works with several knives attached to the chopper rotor. This chopper rotor rotates at high rpm and cuts the straw that is fed to it. The rotating knives pass through a stationary knife bar. At the same time, the chopper rotor must generate an air stream capable of blowing out the chopped straw. To achieve an even distribution by the chopper of the chopped straw from the machine channel width to the harvesting platform, feeding of the straw chopper must be done very evenly. Even feeding is also required with combines that operate with two independent discharge means.

In conventional straw walker combines, even feeding of the chopper generally does not present a problem because the loading of the straw walker is very even. In combines with rotating discharge systems, however, even feeding of the straw chopper is not always guaranteed. With these combines, the straw is conveyed by one or two helical threshing and/or separation rotors through a cylindrical and partially eccentric casing.

As a function of various material parameters, especially the material humidity, the number of revolutions about the threshing and/or separation rotor varies in rotor separation systems. As a result, the exit point from the threshing and/or separation rotor, and thus feeding of the straw, also changes. It is thus conceivable, in the case of a combine equipped with two separation rotors, that dry materials will be cast off more toward the middle, and humid materials more toward the outside. For a combine equipped with only one threshing and/or separation rotor, the material is accordingly cast further to the left or to the right.

In DE 43 13 841 A, an axial flow combine is described in which the crop material other than grain (straw) are fed to a straw chopper with a horizontal rotating shaft that is oriented transversely to the direction of movement. A straw guide means is provided between the outlet of the rotor and the inlet of the straw chopper. The straw guide can be rotated about a shaft located in its front area, to allow adaptation to the respective requirements. A motor is provided for remote adjustment of the straw guide device from the cab of the combine.

EP 0 685 151 A proposed a distribution means for a straw chopper of a combine that comprises a number of laterally contiguous guide plates. The guide plates are moved by servomotors that are coupled to sensors which detect the flight path of the exiting chopped material. The sensors work with light, ultrasound, or microwaves. As a result, compensation for crosswind effects is achieved.

The remotely adjustable straw guide of DE 43 13 841 A, can be considered to have the drawback that the combine operator is distracted from more important tasks during adjustment of the straw guide. The operator can inspect the results of adjustment only indirectly and very incompletely based on the ejected straw. This inspection requires observing via the rearview mirror.

The distribution assembly according to EP 0 685 151 A has the drawback that the sensors proposed therein are complicated and expensive. In addition, there is no possibility here to compensate for uneven feeding of the straw chopper at its inlet.

SUMMARY OF THE INVENTION

It is an object of the present invention to provide a simple system for transversely distributing chopped straw from the straw chopper.

According to a first aspect of the invention, a sensor determines the transverse distribution of the straw. The sensor is connected to a controller that controls a motor. The motor adjusts a straw guide arranged between the separator and the discharge assembly. The discharge assembly can be a straw chopper or another driven device for discharging straw, for example a rotating straw distribution disc.

In this manner, by means of appropriate control of the motor of the straw guide, one can automatically achieve as even as possible a feeding of the discharge assembly on its inlet side. By using sensor signals, the controller can regulate the motor to correctly position the straw guide and react to disturbances in the flow of straw. If two discharge assemblies are arranged laterally adjacent, approximately identical quantities of straw are fed to them through the straw guide. The type and attachment of the sensor is optional; for example, one can use the sensors known from EP 0 685 151 A.

The sensor for determining the transverse distribution of straw should be located upstream from the outlet of the discharge assembly. Consequently, cost advantageous sensors with a relatively small range can be used. They can be arranged at a relatively protected place inside the housing of the discharge assembly, in this specific case, the straw chopper.

The measurement values of the sensors are fed to the controller, which by means of a motor adjusts the straw guide to influence the transverse distribution of straw. The straw guide can be arranged upstream of the inlet of the discharge assembly; or alternatively, or in addition, it can be arranged downstream from the outlet of the discharge assembly. For this purpose, one can consider using, in particular, straw guide plates that are arranged under the distribution hoods. In this case the motor can move the straw guide means at the side adjacent to the discharge assembly. The straw guide plates are thus moved at the end facing the discharge assembly. As a result, it becomes possible to bring the straw guide plates into positions in which they are fed with chopped straw such that the chopped straw is distributed homogeneously over the cutting width of the combine.

The sensors are used to determine the transverse distribution of the straw. In order to avoid using expensive sensors with a relatively high range, it is possible to distribute several sensors over the width of the flow of straw that are each arranged so as to determine proximate straw flow intensity. Such sensors can operate on the basis of capacitance, or they can sense the sounds caused by impact of the harvest material on surfaces adjacent to the sensor. The last sensor type mentioned is already used to determine grain losses in combines. Another sensor type comprises an element that can be moved by the straw against a force generated, for example, by a spring or by gravity. The position of the element depends on the quantity of straw that flows by, and it is preferably determined by a potentiometer.

The sensor signals can be used by the controller not only to control the motor of the straw guide means, but also to control the combine separator. The separator can thus be operated at a speed at which the straw exits from the separator with as even as possible a width distribution. Alternatively, or additionally, it is also conceivable to adjust the guide plates of a separator casing, which influence the number of rotations of the harvested material within the separator, on the basis of the sensor signals to achieve a uniform width distribution of the straw at the outlet of the separator.

DETAILED DESCRIPTION

Figure 1:
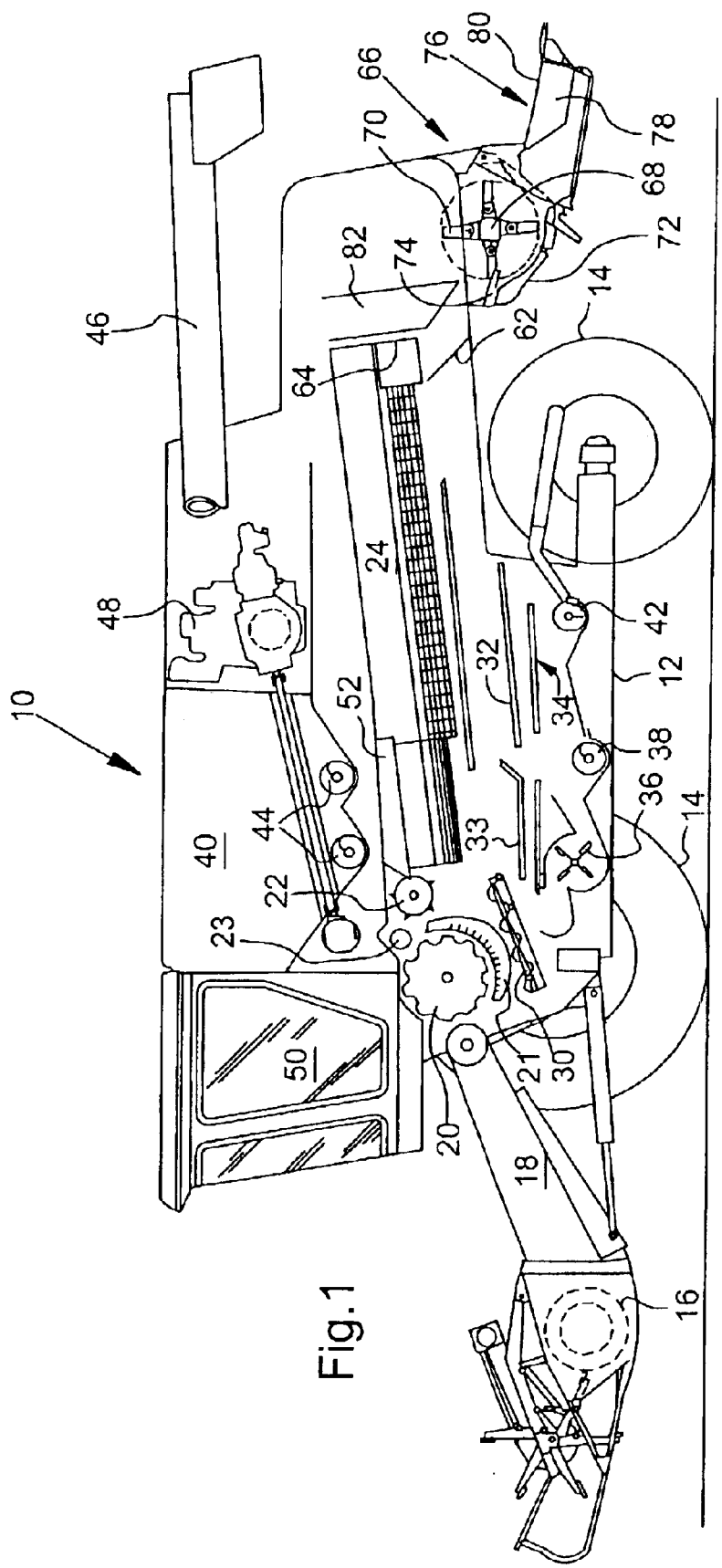
FIG. 1 is a semi-schematic side view of a combine.

FIG. 1 shows a self-propelled combine 10 having a frame 12, which is supported on the ground by wheels 14. The combine 10 is propelled across a field by wheels 14. A harvesting assembly 16 is coupled to the feeder house 18 that extends forwardly from the frame 12. Crop material harvested by the harvesting assembly 16 is directed into the feeder house 18 which conveys the harvested crop material upwardly and rearwardly between the side sheets of the frame 12 into the combine 10. The harvested crop material is processed inside the combine 10 by threshing and separating assemblies. The threshing and separation assemblies comprise a transversely arranged threshing cylinder 20 and a threshing concave 21, to which the harvested crop material is first directed. The threshed crop material is then led to a stripping roll 23 and a transverse beater 22. The beater 22 directs the threshed crop material to two axially arranged separators 24. However, it is also conceivable to omit the transverse threshing cylinder 20 and to use an axially arranged rotary threshing assembly that is integral with an axially arranged separator. It is possible to use a single axial separator or two (or more) axial separators that are arranged next to each other.

The grain and the chaff, which are separated during the threshing process, fall onto at least one auger 30, which leads the grain and chaff to a grain pan 33. Grain and chaff falling from the axial separators 24 fall onto a shaking pan 32, which conveys the grain and chaff to the grain pan 33. The grain pan 33 conveys the grain and the chaff to cleaning shoe 34, which is associated with a blower 36, to facilitate separation of the chaff from the grain. Cleaned grain is led by an auger conveyor 38 to an elevator, not shown, that carries the grain to a grain tank 40. A tailings screw 42 returns unthreshed head portions back to threshing processing via an additional elevator, not shown. Finally, the cleaned grain is unloaded from the grain tank 40 by means of a discharge system with transverse augers 44 feeding a discharge auger 46.

All the above described systems are driven by an internal combustion engine 48 that is operated by an operator from a driver's cab 50. The various means for threshing, conveying, cleaning and separation are located within the support frame 12.

The stripping roll 23 and the beater 22, together with a feed housing 52, lead the threshed crop material from the threshing drum and concave 20 and 21 to the axial separators 24. From the axial separators 24, the harvested crop material other than grain (straw) are thrown out the back through outlet 64. The straw falls by gravity onto the straw guide plate 62 and reach the inlet of a straw chopper 66. The straw chopper 66 comprises a rotor 68 with flails 70 that are distributed over its circumference and along its length. The flails 70 are pivotally suspended on the rotor 68. The rotor 68 rotates in housing 72, about an approximately horizontally shaft transverse to the direction of movement. In cooperation with stationary knives 74, the large straw parts are cut to smaller star parts. At the rear of the straw chopper 66 is arranged the straw spreader 76, which comprises a number of straw guide plates 78 that are arranged laterally adjacent underneath a straw distribution hood 80.

Figure 2:
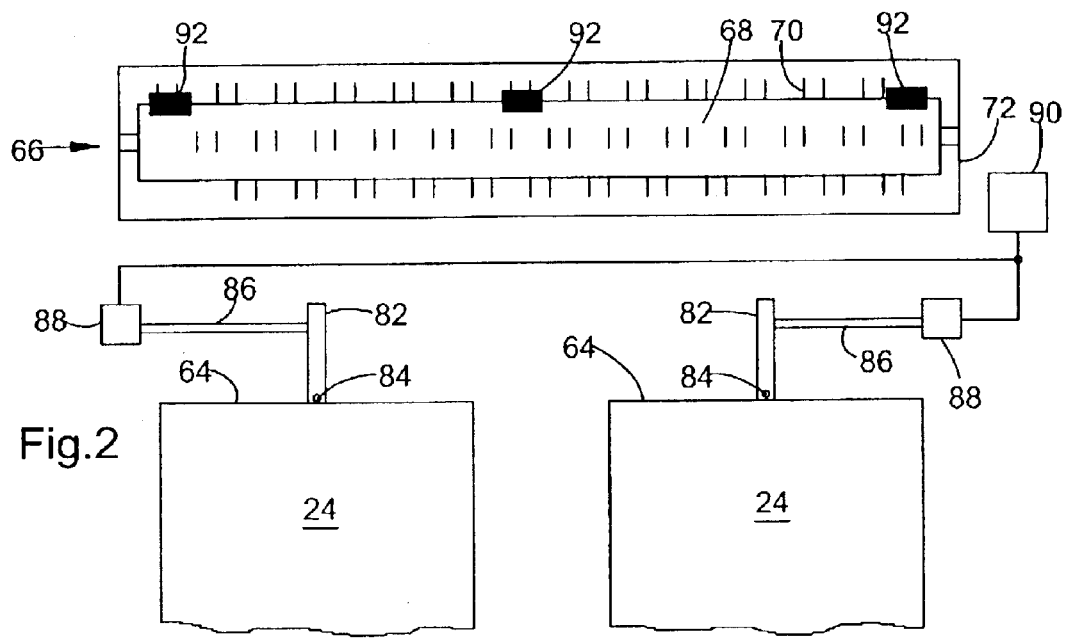
FIG. 2 is a schematic top view of the straw chopper and the end region of the axial separators.

Two straw guides 82 are located next to each other between the outlet 64 of the axial separators 24 and the inlet of the straw chopper 66. The guide plates 82 are approximately vertical and extend in the direction of movement. The relationship of the straw guides 82, to the axial separators 24 and the straw chopper 66 is best illustrated in FIG. 2. Each of the straw guides 82 is located approximately in the middle of the outlet 64 of the respective axial separator 24. They are mounted at the front end on an approximately vertical shaft 84 so they are pivotable on the support frame 12 of the combine 10. Each is mechanically connected by means of coupling rod 86 to a respective motor 88 that can be operated to pivot associated the straw guides 82 about the shaft 84. The farther the straw guides 82 are pivoted to the left by the motor 88, the more crop material is led to the left area of the straw chopper 66, and vice versa.

The motors 88 are electric motors that are connected to a controller 90. The controller 90 is connected to three sensors 92 arranged at the bottom side of housing 72 of the straw chopper 66. The sensors 92, in the embodiment according to FIG. 2, are capacitive sensors that deliver signals which are a function of the quantity of conveyed crop material in close proximity in the housing 72 of the straw chopper 66. Based on the output signals of the three sensors 92, the controller 90 determines whether the left, the middle and the right side of the straw chopper 66 are fed with approximately the same quantities of straw. If not, the motors 88 are actuated until all the sensors 92 delivery approximately the same output signal. For example, if the outer sensors 92 present a lower signal strength than the middle sensor 92, this means that too much straw has been directed to the middle of the straw chopper 66. The controller 90 then intervenes and adjusts the straw guide means 82 in such a manner that more crop material is directed into the outer areas of the straw chopper 66. As a result, the straw becomes distributed more uniformly over the width of the straw chopper 66 and also over the cutting width of the combine 10.

If only a single axial separator 24 is present, a single straw guide 82, or several smaller straw guides may be used. The several small straw guides would be distributed over the width of the outlet of the axial separator 24, as represented, for example, in DE 43 13 841 A. It would also be conceivable to provide only one straw guide 82 that is installed so that depending on its position, the flow of straw is distributed farther to the left or right, or farther toward the inside or outside. For the last mentioned purpose, it is possible to consider using a guide element that divides the flow of material, and that has the shape of a so-called splitter which is moved in the direction of movement of the combine 10.

Figure 3:
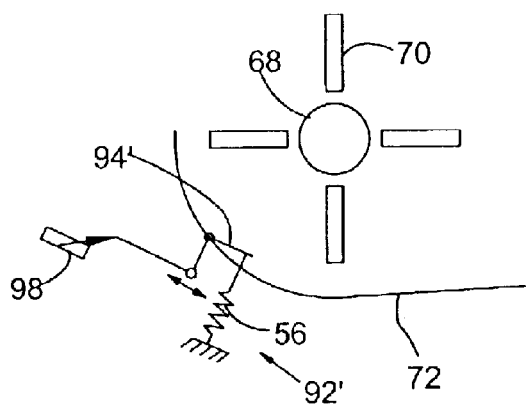
FIG. 3 is a schematic cross sectional view through the housing of a second embodiment of a straw chopper.

FIG. 3 shows a vertical cross section through a straw chopper 66 that is equipped with another embodiment of the sensors 92 for determining the transverse distribution of the straw. The sensors 92' according to FIG. 3 comprise a plate 94 which, at the upstream end relative to the flow of the material, is articulated to the housing 72 so it can be pivoted about a horizontal axis. The plate 94 is supported on the housing 72 by a spring 56, and is mechanically coupled to a potentiometer 98. The straw presses the plate 94 toward the housing 72 against the force of the spring 96, so that the position—and thus the output voltage—of the potentiometer depends in each case on the quantity of straw that flows past the plate. The potentiometer 98 is electrically connected to the control device 90. In the illustrated embodiment, three such sensors 92' are distributed over the width of the flow of the straw.

Figure 4:
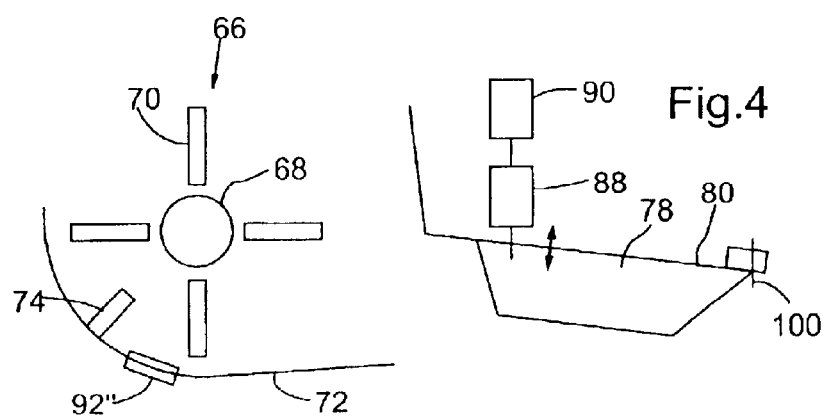
FIG. 4 is a schematic cross section through the housing of a third embodiment of a straw chopper with a straw guide means.

FIG. 4 shows yet another embodiment of a sensor and of a straw guide. Here the sensor 92" is a known knocking sensor like those used to measure grain loss in combines. Cut material that flows by generates, at the housing 72 and/or directly on the sensor 92", acoustical oscillations that are detected by the sensor 92". In this embodiment, the straw guide is not arranged upstream, as described above, but rather downstream of the straw chopper 66. The straw guide is a straw guide plate 78 that is arranged under straw distribution hood 80. The guide plate 78 is pivotally coupled to the distribution hood 80 by an approximately vertical shaft 100. The straw guide plate 78 is connected at its front side with a motor 88 that can be driven to pivot the straw guide plate 78 about the shaft 100. Naturally, several such straw guide plates 78 are distributed over the width of the straw chopper 66. Either a common motor 88 is assigned to them, or the various straw guide plates or groups of straw guide plates are adjusted by several motors 88.

The controller 90 receives output signals from the sensors 92" that provide information regarding the quantities of straw flowing by the sensors 92". The controller 90 controls the motor 88, or the motors 88, as a function of the output signals of the sensors 92" such that at least an approximately uniform distribution of chopped straw is achieved over the cutting width of the combine 10. For example, the position of the straw guide plates 78 would be adjusted to direct more chopped straw outwardly if the sensors 92" indicate a greater flow of straw in the middle of the straw chopper 66. It is also conceivable to move the straw guide plates 78 at their back sides as well. Furthermore, it is conceivable to use sensors of slope, and/or wind direction and strength, to control the motors of the adjustable straw guide plates. The straw guide according to the invention can be used not only in the described axial combines, but also in conventional combines having straw walkers.

Having described the illustrated embodiment, it will become apparent that various modifications can be made without departing from the scope of the invention as defined in the accompanying claims.

What is claimed is:

1. An agricultural combine comprising a separator and a discharge assembly for receiving straw from the separator and discharging the straw from the combine, an adjustable straw guide is associated with the discharge assembly, the adjustable straw guide is positioned by a motor, the motor is controlled by a controller that is in communication with a sensor installed to sense the transverse distribution of straw, wherein the straw guide is arranged between the separator and the discharge assembly.

2. The agricultural combine as defined by 1 wherein the discharge assembly is a straw chopper.

3. The agricultural combine as defined by claim 2 wherein the adjustable straw guide is positioned by the controller to evenly distribute straw to the straw chopper from the separator.

4. The agricultural combine as defined by claim 2 wherein the straw chopper has an outlet from which straw is expelled from the straw chopper, the sensor is located upstream from the outlet of the straw chopper.

5. The agricultural combine as defined by claim 4 wherein the straw chopper is provided with a housing and the sensor is located in the housing.

6. The agricultural combine as defined by claim 2 wherein the straw chopper has a housing having a width and several sensors are distributed over the width of the straw chopper, each being installed to determine material flow intensity.

7. The agricultural combine as defined by claim 6 wherein at least one of the sensors is a capacitance sensor.

8. The agricultural combine as defined by claim 6 wherein at least one of the sensors detects noises caused by impacting straw.

9. The agricultural combine as defined by claim 6 wherein at least one of the sensors comprise an element which can be moved by the straw, and whose position can be detected.

10. The agricultural combine as defined by claim 1 wherein the separator comprises a rotor arranged in a housing.

11. An agricultural combine comprising a separator and a straw chopper for receiving straw from the separator and discharging the straw from the combine through an outlet, an adjustable straw guide is associated with the straw chopper, the adjustable straw guide is positioned by a motor, the motor is controlled by a controller that is in communication with a sensor installed to sense transverse distribution of straw, wherein the sensor is arranged in the straw chopper upstream from the outlet.

12. The agricultural combine as defined by claim 11 wherein the straw chopper is provided with a housing and the sensor is located in the housing.

13. The agricultural combine as defined by claim 12 wherein housing of the straw chopper has a width and several sensors are distributed over the width of the housing, each being installed to sense material flow intensity.

14. The agricultural combine as defined by claim 13 wherein at least one of the sensors is a capacitance sensor.

15. The agricultural combine as defined by claim 13 wherein at least one of the sensors detects noises caused by impacting straw.

16. The agricultural combine as defined by claim 13 wherein at least one of the sensors comprises an element which can be moved by the straw, and whose position can be detected.

* * * * *